United States Patent
Eck et al.

(10) Patent No.: US 8,713,378 B2
(45) Date of Patent: Apr. 29, 2014

(54) HEALTH MONITORING OF APPLICATIONS IN A GUEST PARTITION

(75) Inventors: Christopher Eck, Sammamish, WA (US); Lars Reuther, Kirkland, WA (US); Rajesh Dave, Redmond, WA (US); Lokesh Srinivas Koppolu, Redmond, WA (US); Steven Ekren, Redmond, WA (US); David Dion, Bothell, WA (US); Sergey Meshcheryakov, Bellevue, WA (US); Jonathan Fischer, Carnation, WA (US); Angshuman Bezbaruah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 13/177,578

(22) Filed: Jul. 7, 2011

(65) Prior Publication Data

US 2013/0013953 A1    Jan. 10, 2013

(51) Int. Cl.
    *G06F 11/00* (2006.01)
(52) U.S. Cl.
    USPC .................. 714/48; 714/10; 714/11
(58) Field of Classification Search
    USPC ................ 714/10–12, 48, 38.1
    See application file for complete search history.

(56) References Cited

U.S. PATENT DOCUMENTS

| | | | |
|---|---|---|---|
| 6,920,587 B2 * | 7/2005 | Dawkins et al. | 714/48 |
| 6,957,364 B2 * | 10/2005 | Shimooka et al. | 714/25 |
| 6,996,748 B2 * | 2/2006 | Uhlig et al. | 714/38.13 |
| 7,478,272 B2 * | 1/2009 | Armstrong et al. | 714/10 |
| 7,809,976 B2 | 10/2010 | Goodson et al. | |
| 7,979,749 B2 * | 7/2011 | Jann et al. | 714/38.1 |
| 8,015,431 B2 * | 9/2011 | Baba et al. | 714/4.1 |
| 8,201,169 B2 * | 6/2012 | Venkitachalam et al. | 718/1 |
| 2007/0100987 A1 | 5/2007 | Aggarwal et al. | |
| 2010/0122343 A1 | 5/2010 | Ghosh et al. | |

OTHER PUBLICATIONS

Chenley, "Clustered Virtual Machine", Retrieved at <<http://blogs.technet.com/b/chenley/archive/2009/02/09/clustered-virtual-machine.aspx>>, Feb. 9, 2009, pp. 3.

"vSphere Basic System Administration", Retrieved at http://www.vmware.com/pdf/vsphere4/r40/vsp_40 _admin_guide.pdf>>, Retrieved Date: Mar. 1, 2011, pp. 370.

"What's New in VMware Infrastructure 4", Retrieved at http://www.bjornbats.n1/?p=296>>, Retrieved Date: Mar. 3, 2011, pp. 10.

(Continued)

*Primary Examiner* — Yolanda L Wilson
(74) *Attorney, Agent, or Firm* — John Jardine; Andrew Sanders; Micky Minhas

(57) ABSTRACT

A health monitoring technique monitors the health and performance of applications executing in a guest partition in a virtualized environment. In an embodiment, a guest integration component interacts with an application through an application programming interface in order for the virtualization platform to monitor the health and performance of the application. In another embodiment, the guest integration component may include a monitoring agent that accesses an event log and/or a performance monitor log to access the health and performance of the application. The health and performance of the application may then be analyzed by the virtualization platform to determine an appropriate remedial action.

20 Claims, 8 Drawing Sheets

(56) References Cited

OTHER PUBLICATIONS

Ekren, Steven, "Achieving High Availability for Hyper-V", Retrieved at <<http://technet.microsoft.com/en-us/magazine/2008.10.higha.aspx>>, Retrieved Date: Mar. 3, 2011, pp. 7.

MSFT, Symon Perriman, "Guest Failover Clustering with VMware", Retrieved at <<http://blogs.msdn.com/b/clustering/archive/2010/07/27/10042799.aspx>>, Jul. 26, 2010, pp. 2.

* cited by examiner

HEALTH MONITORING OF APPLICATIONS IN A GUEST PARTITION

BACKGROUND

Virtualization is a technique used to support independent execution environments on a single computer. An execution environment is typically used to execute one or more applications under a guest operating system that is independent of other execution environments running on the same computer. Each execution environment can be configured as a guest partition, otherwise known as a virtual machine. The guest partition is a software implementation of a computer that executes applications as if they were executed on a single computer. The guest partition is configured by a hypervisor that also manages the allocation of resources for the guest partition.

The hypervisor operates in an execution environment that is separate from the guest partition and has no knowledge of the health of the applications running in the guest partition. As such, anomalous events that occur within an application can only be remedied by the application or the guest operating system. However, if the application or the guest operating system cannot remedy the anomalous event, the application may suffer a catastrophic failure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A health monitoring technique monitors the health of applications executing in a guest partition in a virtualized platform. The virtualization platform ensures that the guest partitions are isolated from each other and provides each guest partition with the virtual resources and services needed for each guest partition to operate. The virtualization platform includes an application health monitor and recovery engine that monitors an application resident in the guest partition for anomalous events and/or conditions affecting the performance of the application.

A guest partition interacts with the virtualization platform through a guest integration component. In an embodiment, a guest integration component interacts with an application through an application programming interface in order for the virtualization platform to monitor the health and performance of the application. In another embodiment, the guest integration component may include a monitoring agent that accesses an event log and/or performance monitor log to access health and/or performance data pertaining to the application. The health and/or performance of the application may be analyzed by the application health monitor and recovery engine which may determine an appropriate remedial action.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
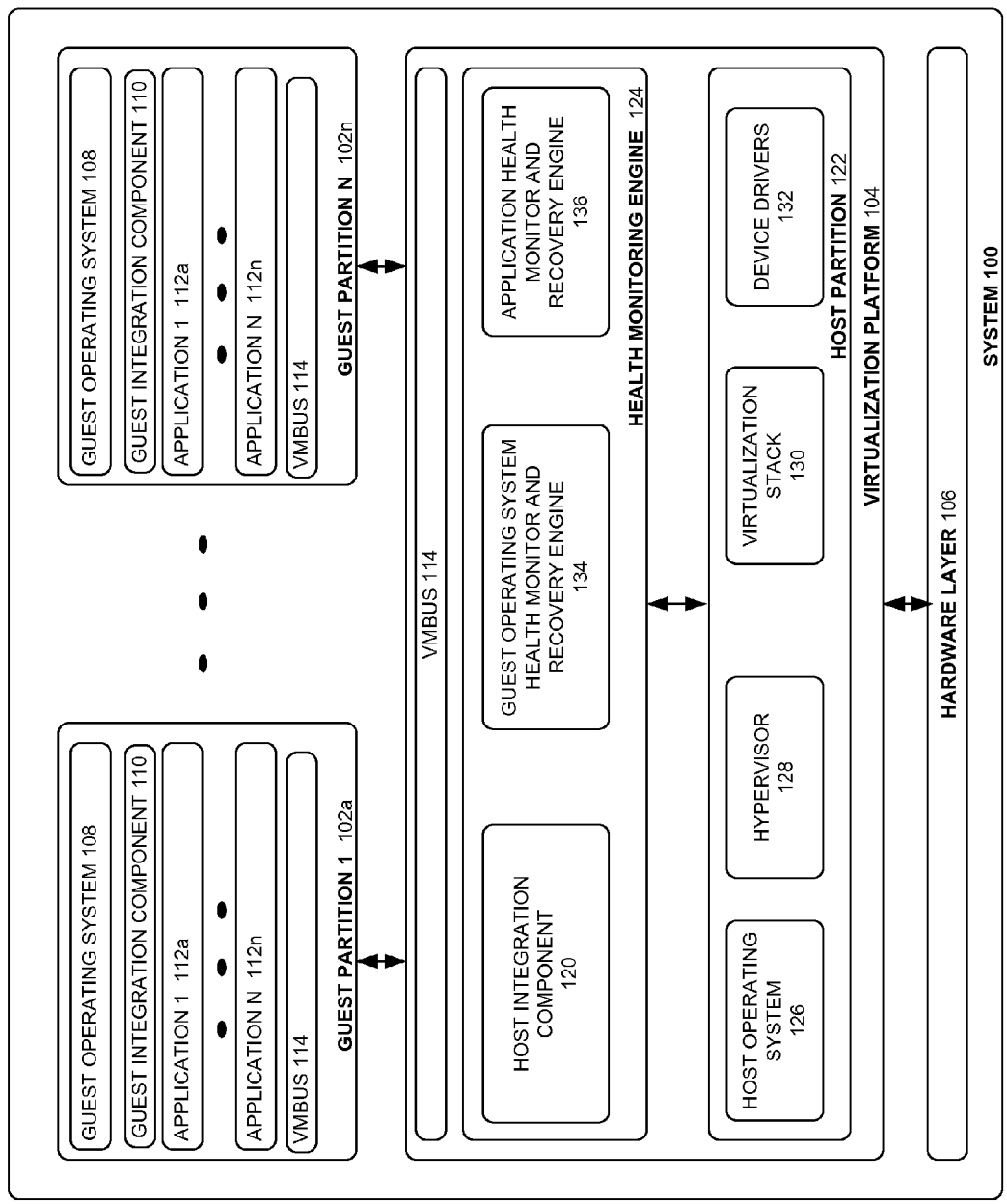
FIG. 1 illustrates an exemplary system for the health monitoring and remediation of applications in a guest partition.

Various embodiments are directed to a technology and techniques for monitoring the health and/or performance of applications running in a guest partition of a virtualization platform. A virtualization platform has the capability of executing several guest partitions independently on a single computing device. The virtualization platform configures the guest partitions, allocates virtual resources to each guest partition, provides access to the hardware devices, and provides health monitoring services.

Each guest partition includes a guest operating system that enables one or more applications to execute in the guest partition. Occasionally, an application may experience anomalous events that cause the application to fail, deadlock, or perform poorly. For certain types of anomalous events, the application may be able to remedy the problem initially or the guest operating system may provide remedial action in the event the application is not successful. In the event, the application or the guest operating system cannot remedy the anomalous event, a guest integrated component is the next course of remedial assistance.

Each guest partition includes a guest integration component that interacts with the virtualization platform. The guest integration component has an application programming interface (API) that may be used by an application to inform the guest integration component of the health of the application. The application may use the API to provide health data relating to the health of the application. The health data is forwarded to an application health monitor and recovery engine in the virtualization platform that analyzes the health data and determines an appropriate remedial action.

In another embodiment, the guest integration component may include a monitoring agent that accesses an event log and/or performance monitor log to access health and performance data pertaining to the application. In this manner, the application does not need to be modified to interact directly with the guest integration component. In some situations, it may not be feasible or practical to modify a legacy application to include the guest integration component API. In other situations, privacy concerns may necessitate the isolation of the application from components of the virtualization platform.

The event log stores significant events that occur affect the performance of the application running in the guest partition. For example, an application may report or log events into the event log at various points in the execution of the application. Any of the system components may also log events into the event log. For example, a network component may log events when a network connection is not operational, a storage component may log events about storage issues, and so forth. An application or system component may report or log events into the event log at any time during execution of the application. The monitoring agent accesses the event log for certain events that may indicate or forewarn of a catastrophic event. For example, an application may periodically log an event indicating its operational status. The monitoring agent may monitor the event log for this event and in its absence recognize a possible anomalous event. The events are forwarded to the application health monitor and recovery engine which determines an appropriate remedial action.

In addition, the managing agent may access a performance log that stores performance data pertaining to the performance of the application. The managing agent may forward to the application health monitor and recovery engine various performance measurement data that is then analyzed by the application health monitor and recovery engine. The application health monitor and recovery engine may determine an appropriate remedial action to improve the performance of the application.

In the event the guest integration component is not able to remedy the anomalous event, the guest integration component notifies the virtualization platform and the virtualization platform assumes control to provide an appropriate remedial action.

The health and performance monitoring techniques provide several advantages. By monitoring the health and performance of the application, the virtualization platform may be given advanced warning of a failure and the opportunity to prevent the failure. As such, the application is able to execute continuously without suffering interruptions or long delays for diagnosing and remedying a failure. In analyzing the performance parameters representing the application's operational condition, the performance of the application is improved as well as the overall performance of the virtualization platform.

FIG. 1 shows an exemplary system 100 having one or more guest partitions 102a-102n (collectively 102), a virtualization platform 104, and a hardware layer 106. In several embodiments, the system 100 utilizes server virtualization where the system is implemented as a single computing device able to run simultaneously two or more independent execution environments. The system 100 may be any type of electronic device capable of executing a sequence of instructions in a defined manner, such as, without limitation, a server, a personal computer, a workstation, a notebook, laptop, a tablet PC, a personal digital assistant (PDA), a mobile device, a cell phone, and so forth. The system 100 may be a general purpose computing device or a customized computing device, such as, a multi-processor system, a single processor system, and a customized hardware device.

Each guest partition 102 is isolated from the other guest partitions 102. Each guest partition 102 may have a guest operating system 108, one or more applications 112a-112n (collectively 112), a VMbus 114, and a guest integration component 110. A guest partition 102 is configured by a virtualization platform 104 that provides each guest partition 102 with a set of virtual resources and access to the devices in the hardware layer 106. The virtual resources may include virtual processors and virtual memory that are under the control of the virtualization platform 104. The virtual processors are executable instructions and state information that provide a representation of a physical processor with a specific instruction set. The virtual memory is a guest address space that may be a portion of a larger address space managed by the virtualization platform 104. In addition, each guest partition 102 has access to the hardware resources through a virtualization service client in the guest partition (not shown) that requests services from the hardware layer 106 through the virtualization platform 104.

Each guest partition 102 may be running a different operating system, such as, without limitation, a Windows-based operating system, a Linux-based operating system, and so forth. In addition, the operating systems running in a guest partition 102 may be hypervisor-aware or non-hypervisor aware operating systems. A hypervisor-aware operating system recognizes that it is running in a virtualized execution environment and that it has a guest integration component 110 that enables it to communicate with the virtualization platform 104. A non-hypervisor aware operating system may use an emulator to communicate with the virtualization platform 104.

Each application 112 running inside a guest partition 102 may be implemented as a software component, program, computer program, system program, machine program, operating system software, middleware, firmware, software module, routine, subroutine, function, method, procedure, software interface, application program interface, instruction set, computing code, code segment, and any combination thereof. Exemplary applications may include a SQL server, a file server, an email server, and so forth.

The VMbus 114 provides a dedicated point-to-point channel to transport data and requests securely between a guest partition 102 and the virtualization platform 104. There is a dedicated VMbus 114 for each guest partition 102 and the data transported therein is not accessible by any of the other guest partitions 102. The guest partition 102 and the virtualization platform 104 only have control over the information transmitted through the VMbus. It should be noted that the term "VMbus" as used herein refers to a generic communication channel between the guest partition 102 and the virtualization platform 104 that is dedicated for the use of a specific guest partition 102 to the virtualization platform 104 and is not constrained to any particular type of implementation. In alternate embodiments, the VMbus or communication channel may be implemented as a private network having a dedicated virtual switch within each guest partition 102 that is connected to the host partition 122. The virtual switch may be implemented using Microsoft's Virtual Network Switch Protocol.

In addition, the guest partition 102 may include a guest integration component 110. The guest integration component 110 enables the virtualization platform 104 to interact with the guest partition 102 and to provide additional services to the guest partition 102. For example, the guest integration component 110 interacts with a host integration component 120 in the virtualization platform 104 to allow the virtualization platform 104 to monitor the applications 112 and the guest operating systems 108 for anomalous events and poor performance.

In one or more embodiments, the guest integration component 110 may be part of the virtualization platform 104, that is, provided by the provider of the virtualization platform 104, and implemented as a plug-in to the guest operating system 108. A plug-in is a form of program code that provides additional capabilities, such as custom commands or features, to an existing application, such as the guest operating system 108. Plug-ins are otherwise known as add-ins, snap-ons, or extensions. Typically, a plug-in registers with the guest operating system 108 and thereafter interacts with the guest operating system 108 through an application programming interface. The inclusion of the guest integration component as a plug-in to the guest operating system 108 avoids having program changes made to the guest operating system 108 to incorporate the capabilities of the guest integration component 110.

The virtualization platform 104 may have a VMbus 114, a host partition 122, and a health monitoring engine 124. The VMbus 114 facilitates communications between each guest partition 102 and the virtualization platform 104 as described above. The host partition 122 provides a number of services that create the independent guest partitions and provides the virtual resources needed for each guest partition 102.

The host partition 122 may include a host operating system 126, one or more device drivers 132, a hypervisor 128, and a virtualization stack 130. The host operating system 126 may be any type of operating system and may be different from any of the guest operating systems 108. Each device driver 132 is associated with a hardware device in the hardware layer 106 and is used to control access to and the operation of the corresponding hardware device. The host partition 122 may include a virtualization service provider (not shown) that communicates directly to the device drivers 132 and offers the services provided by the hardware device requested by a guest partition 102. The hardware devices in the hardware layer 106 are categorized by device types, such as, networking, video, storage, input devices, and so on. Each device type has a corresponding virtualization service client/virtualization service provider pair (not shown). A guest partition 102 requests the services of a device type through its corresponding virtualization service client/virtualization service provider pair.

The hypervisor 128 creates the guest partitions 102 and allocates the virtual resources for a guest partition 102. The hypervisor 128 may manage the memory and processor scheduling for a guest operating system 108, enforce memory access rules, enforce rules for CPU usage, and provide a mechanism to virtualize input/output resources. In several embodiments, the hypervisor 128 may be implemented as software or firmware and in other embodiments, the hypervisor 128 may be implemented directly in the physical hardware.

The virtualization stack 130 is a collection of software components that enables the virtualization of a computing device for the guest partitions. The virtualization stack 130 works with the hypervisor 128 to provide guest partition processes, emulated devices, management services and user interfaces that enable the guest partitions 102 to execute as intended.

The health monitoring engine 124 monitors the guest operating systems 108 and applications 112 for anomalous events in order to quickly diagnose and remediate the anomalous events. An anomalous event may include any type of failure or error such as, without limitation, program failures, hardware faults, processor interrupts, program interrupts, memory faults, resource contention problems, and the like, attributable to either the guest operating system 108 or an application 112 running in a guest partition 102.

In addition, the health monitoring engine 124 may monitor the application 112 to ensure that is performing in accordance with certain performance criteria. For example, the health monitoring engine 124 may monitor an application's processor usage, memory latencies, network delays, and so on and recommend remedial actions needed to improve a performance criterion. Accordingly, health monitoring pertains to monitoring for anomalous events and/or for performance degradation.

The health monitoring engine 124 may include a host integration component 120, a guest operating system health monitor and recovery engine 134 and an application health monitor and recovery engine 136. The host integration component 120 interacts with the guest integration component 110 to facilitate the health monitoring operations. The guest operating system health monitor and recovery engine 134 monitors the health of the guest operating system 108 and provides remedies for anomalous events occurring at the guest operating system level. The guest operating system health monitor and recovery engine 134 may utilize techniques such as exception handling, code reloading, micro-rebooting, automatic system service restarts, and watchdog timer based recovery to repair the guest operating system from a variety of errors.

The application health monitor and recovery engine 136 monitors the health of one or more of the applications 112 running in a guest partition 102. The application health monitor and recovery engine 136 may provide remedies, such as a system restart, for anomalous events that may occur during execution of an application 112. In one or more embodiments, the application health monitor and recovery engine 136 may utilize techniques such as exception handling, code reloading, micro-rebooting, automatic system service restarts, and watchdog timer based recovery to repair an application from a variety of errors. In addition, the application health monitor and recovery engine 136 may monitor an application for performance degradation and provide remedial measures to improve certain performance measures.

The hardware layer 106 includes the physical hardware devices such as, input/output (I/O) devices, network interface cards, graphic cards, printer(s), a keyboard, a display, storage devices, hard disk drives, optical drives, network adaptors, graphic processors, touch screen, microphone, speakers, a system console, and so forth.

Although the system 100 shown in FIG. 1 has a limited number of elements in a certain configuration, it should be appreciated that the system 100 can include more or less elements in alternate configurations. In addition, the functions of the components shown in system 100 may be configured in alternate arrangements. For example, the host operating system 126 may perform the functions of the hypervisor 128 or vice versa. The hypervisor 128 may be an independent component from the host partition 122. Additionally, the functions performed by the guest operating system health monitor and recovery engine 134 and/or the application health monitor and recovery engine 136 may be performed by the host operating system 126, the hypervisor 128, or any combination thereof.

In addition, there may be several application health monitor and recovery engines 136 where each application health monitor and recovery engine 136 is configured to monitor specific applications 112, guest partitions 102, or any combination thereof. The application health monitor and recovery engine 136 may be composed of various components that in the aggregate may perform the health monitoring functions and/or performance monitoring functions. For example, there may be a component that performs the health and performance monitoring function and another component that analyzes the health monitoring data to determine an appropriate remedial action, or any combination thereof. The embodiments are not limited in this manner.

In various embodiments, the system 100 described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

The various components of system 100 may be communicatively coupled via various types of communications medium as indicated by various lines or arrows. The components may coordinate operations between each other. The coordination may involve the uni-directional or bi-directional exchange of information. For instance, the components may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces and/or serial interfaces.

Figure 2:
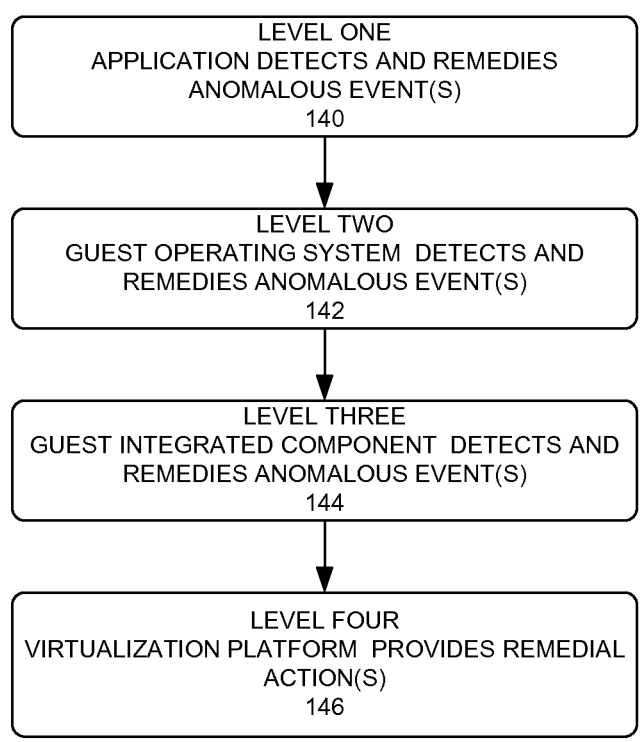
FIG. 2 illustrates an exemplary hierarchy of the levels of health monitoring and remediation.

FIG. 2 illustrates a hierarchy of levels for health monitoring and remediation. The first level takes place within the application 112 running in the guest partition 102 (block 140). The application 112 may identify an anomalous event which the application 112 may be configured to self remediate. Depending on the type of anomalous event, the application 112 may restart itself, terminate a thread process, and so on.

The second level of health monitoring and remediation is initiated by the guest operating system 108 (block 142). In the event the application fails, the guest operating system 108 may be configured to take remedial action. Based on the type of anomalous event, the guest operating system 108 may restart the application 112, reset a device, allocate a resource, release a resource, and so on.

The third level of health monitoring and remediation is performed by the guest integration component 110 within the guest partition 102 (block 144). The remediation at the third level may be activated when the first and second levels of remediation have been unsuccessful. As will be described in more detail below, the guest integration component monitors and remediates the applications within a guest partition 102 in accordance with directives from the virtualization platform 104.

The fourth level of health monitoring and remediation is performed by the virtualization platform 104 (block 146). The remediation at the fourth level may be activated when the first, second, and third levels of remediation have been futile. As will be described in more detail below, the virtualization platform 104 constructs and applies an appropriate remedial action.

Figure 3:
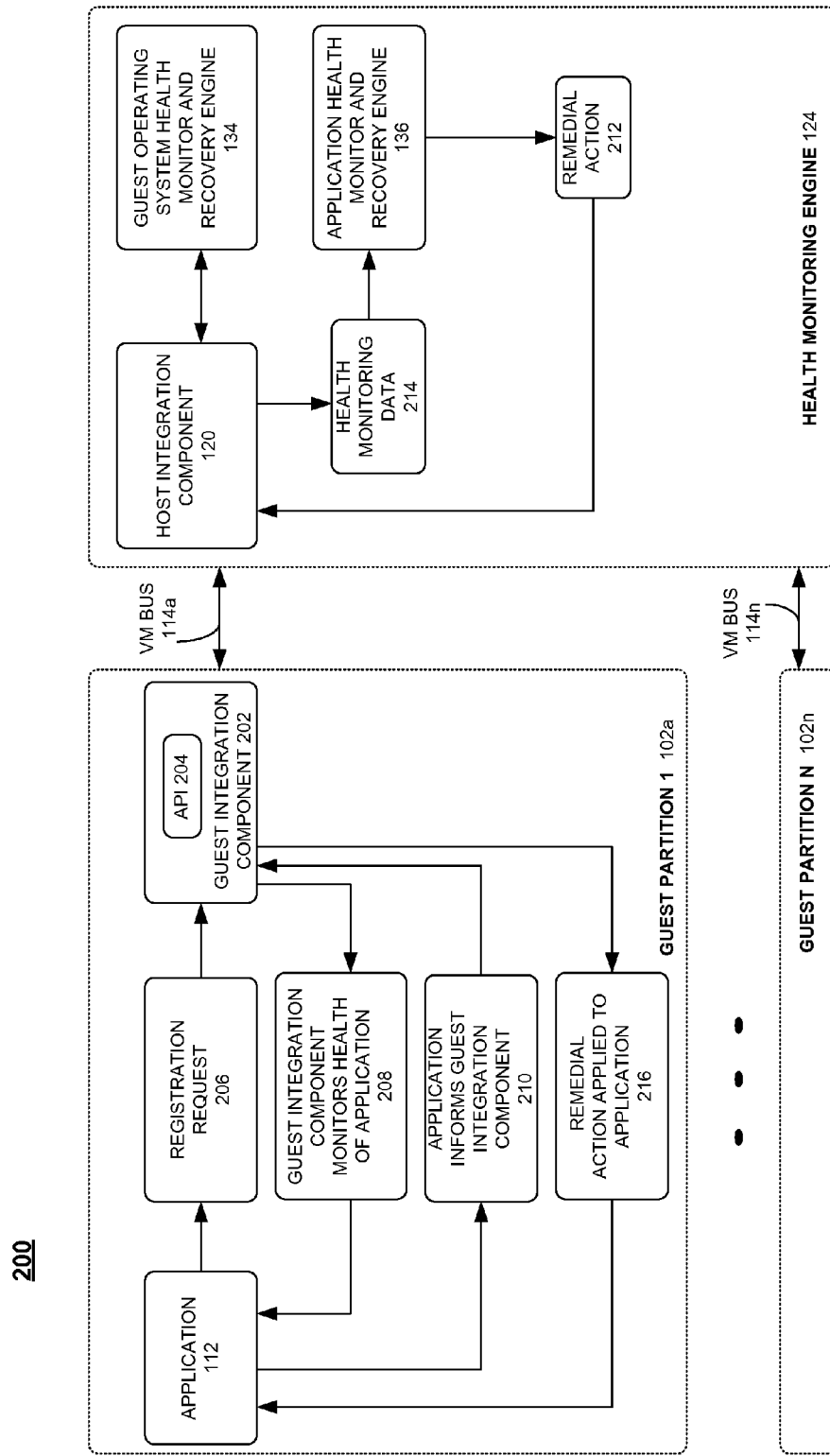
FIG. 3 illustrates a first operating environment.

FIG. 3 illustrates an operating environment 200. The operating environment 200 provides an example of monitoring and remedying the health and performance of applications 112 in a guest partition 102 through a guest integration component 110 residing in the guest partition 102. Although the operating environment 200 shown in FIG. 2 has a limited number of elements in a certain configuration, it should be appreciated that the operating environment 200 can include more or less elements in alternate configurations.

In operating environment 200, the guest integration component 202 includes an application programming interface (API) 204 that is used in monitoring the health and performance of an application 112. The application 112 is aware of the API 204. The application 112 registers with the guest integration component 202 and thereafter, the health of the application is monitored by the guest integration component 202 through the API 204. The application health monitor and recovery engine 136 may be notified of any anomalous events and may propose remedial actions 212.

In one or more embodiments, the API 204 may be implemented as a remote procedure call. A remote procedure call is a form of messaging where a sender appears to be executing or calling a local procedure with specified parameters. The handler of the remote procedure call runs in a separate address space and security domain. The application 112 invoking the remote procedure call is not aware of the remoteness of the procedure call. A response from the execution of the remote procedure call may be returned to the sender. There are many variations to a remote procedure call and any such variation may be employed for an intended implementation. In an embodiment, the handlers of the APIs 204 or remote procedure calls may be part of the guest integration component 110.

Referring to FIG. 3, each guest partition 102 is communicatively coupled to the virtualization platform through a distinct VMbus 114 that connects the guest integration component 202 of a particular guest partition 102 to the host integration component 120. The host integration component 120 is communicatively coupled to the guest operating system health monitor and recovery engine 134 and the application health monitor and recovery engine 136. The host integration component 120 receives data pertaining to anomalous events for both the guest operating system 108 and the applications 112 and forwards the anomalous event data to the respective monitor and recovery engine. Data pertaining to an anomalous event occurring with the guest operating system 108 may be forwarded to the guest operating system health monitor and recovery engine 134 and data pertaining to an anomalous event occurring with an application may be forwarded to the application health monitor and recovery engine 136.

An application 112 registers with the guest integration component 202 through a registration request 206. The registration request 206 may be made through the API 204. Once the application 112 registers with the guest integration component 202, the guest integration component 202 polls the application 112 at regular time intervals. The application health monitor and recovery engine 136 may set the time intervals at which the guest integration component 202 polls. The guest integration component 202 may request certain health monitoring data from the application 208. For example, the guest integration component 202 may request raw performance data from the application (e.g., input processing queue length, I/O queue length, transactions per second, etc.) and based on this performance data determine whether or not the application may be performing poorly.

If the application 112 does not respond to the guest integration component 202, the guest integration component 202 may repeat the request a predetermined number of times before notifying the application health monitor and recovery engine 136 that the application has not responded. The notification may be made by forwarding to the application health monitor and recovery engine 136 health monitoring data 214 indicating the lack of response.

The application 112 may respond to the guest integration component's request 210 and provide the guest integration component 202 with the requested health monitoring data. The application's response may be made through the API 204. Alternatively, the application 112 may notify the guest integration component 202 of an anomalous event or of a situation pertaining to a performance problem, through a notification 210, without receiving a request by the guest integration component 202. The application may perform a self-assessment analysis of its own performance and inform the guest integration component 202 through an API 204 of its problem.

The health monitoring data 214 may be forwarded to the application health monitor and recovery engine 136 for analysis. The application health monitor and recovery engine 136 may recommend a remedial action 212 that is forwarded to the guest integration component 202. Depending on the remedial action, the guest integration component may forward the remedial action to the application or the remedial action may be forwarded to the guest operating system for the guest operating system to apply the remedial action 216.

Figure 4:
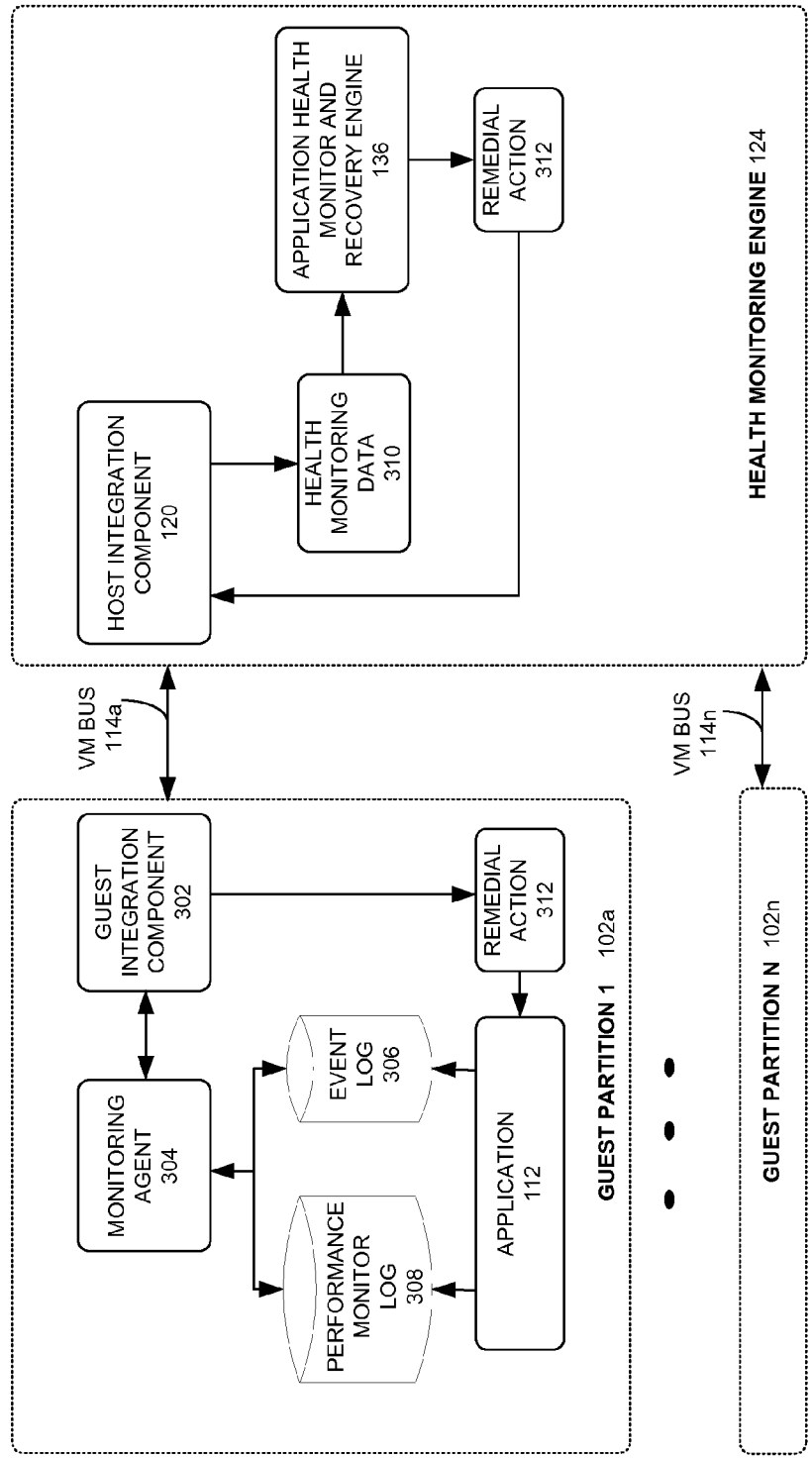
FIG. 4 illustrates a second operating environment.

FIG. 4 illustrates a second operating environment 300. In the second operating environment 300, the guest integration component 302 utilizes a monitoring agent 304 to monitor the health of an application 112. The monitoring agent 304 accesses an event log 306 to determine the events that may have occurred in the execution of the application 112 and/or a performance monitor log 308 to determine performance characteristics of the application 112. In this operating environment 300, the application 112 does not interact with the guest integration component 302.

The event log 306 stores the significant events that occur during the execution of an application 112 running in the guest partition 102. An event log 306 may contain the anomalous events in addition to other events, such as checkpoints, backups, security breaches, and so forth. The application 112 logs the events into the event log 306 at various points in the execution of the application 112.

There may be several event logs, such as one for each application. In addition, there may be different types of event logs, such as an application log and a system log. An application log may store the significant events that occur during the execution an application and the system log may store the significant events that occur during execution of the guest operating system. For example, a database application may record a file error in the application log and when a device driver fails to load during startup and another record may be stored in the system log detailing this event. Generally, it is up to the developer of the application and the guest operating system to determine the events that are stored in the event log 306.

Each event log 306 may have a schema that is used to classify each event (e.g., low, medium, or critical). The event log 306 may be read through an application program interface that uses the schema to find certain events. For example, the monitoring agent 304 may access the event log to determine if the application 112 has encountered a particular event or events within a certain time interval. The monitoring agent 304 can monitor the event log 306 at predefined intervals, upon the request of the application health monitor and recovery engine 136, or upon notification from signals or system events raised by the guest operating system when certain events are written into the event log. The events or health monitoring data 310 are forwarded to the application health monitor and recovery engine 136 for analysis. Based on the nature of the event, the application health monitor and recovery engine 136 determines a remedial action 312 to remedy the event. The remedial action 312 is then forwarded to the guest integration component 302 which in turn arranges for the activation of the remedial action.

A performance monitor log 308 stores performance data related to the operation of the components of the system, such as processor usage, processor latency, processor delay, memory usage, memory latency, memory delay, network usage, network latencies, network delays, I/O usage, I/O latencies, and I/O delays. The performance data may be collected during the course of the execution of an application through a performance monitor tool. The performance monitor tool may be a stand-alone tool, part of the guest operating system or a plug-in that is annexed to the guest operating system. The performance monitor tool may utilize performance counters that measure a particular virtual resource.

For example, to measure the virtual disk I/O performance of an application 112, a performance counter measures the amount of time that read and write operations take to respond to the application 112. If the average response times are below a certain threshold, then the virtual disk I/O performance may be considered suboptimal or poor and remedial action may be recommended. The performance monitor tool may have a set of performance counters that measure other functions of the system, such as memory usage, memory availability, network latency, network file transfers, network utilization, network interface output queue length, processor utilization, and so forth.

In one or more embodiments, the monitoring agent 304 may include a performance monitor tool that may be activated by a request from the application health monitor and recovery engine 136 to monitor certain components and operations of the application 112 for a predefined time interval. The guest integration component 302 may receive the request and engage the monitoring agent 304 to collect certain performance data from the performance monitor log 308 for a specified duration. The performance data or health monitoring data 310 may be forwarded to the application health monitor and recovery engine 136 for analysis. The application health monitor and recovery engine 136 may then determine a remedial action 312 which may then be forwarded to the application 112 through the host integration component 120 and the guest integration component 302 to improve the performance of the application.

Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose, specific-purpose computer, processor, multi-processor).

Figure 5:
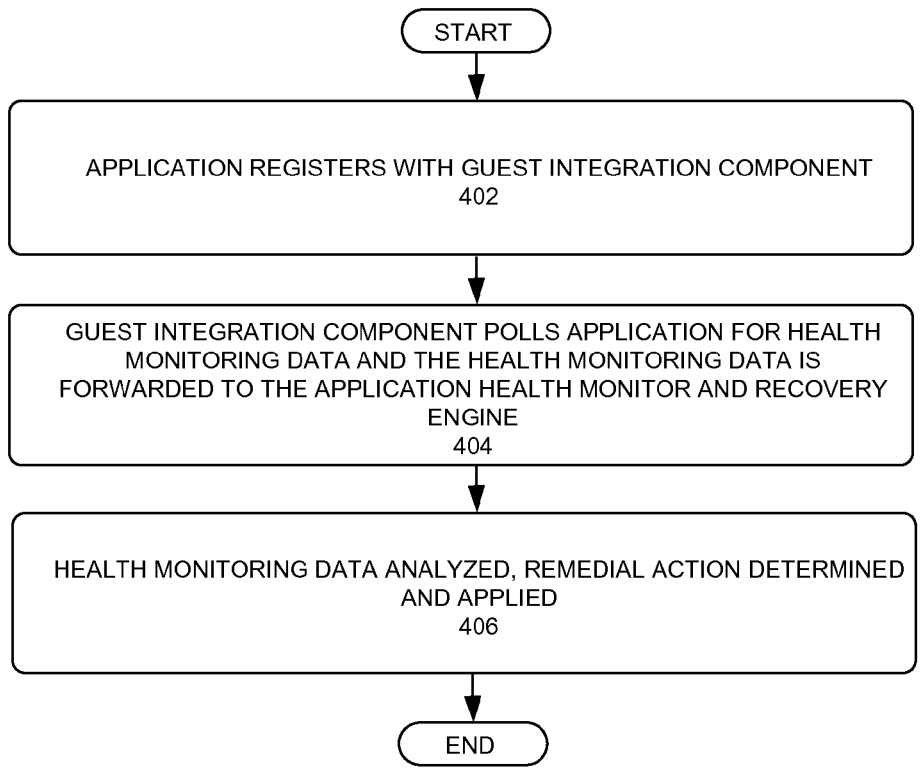
FIG. 5 illustrates a first exemplary process for the health monitoring and remediation of applications in a guest partition.

FIG. 5 is a flow chart illustrating an embodiment of a process flow for health monitoring applications in a guest partition 400. In the illustrated embodiment shown in FIG. 5, a guest integration component 202 may receive a registration request 206 from an application 112 (block 402). Upon receipt of the registration request 206, the guest integration component 202 polls the application for health monitoring data at predetermined time intervals (block 404). The application 112 responds to the request through the API 204 of the guest integration component 202. The health monitoring data 214 is then forwarded to the application health monitor and recovery engine 136 which analyzes the health monitoring data 214 and determines an appropriate remedial action 212 (block 406). The remedial action 212 is then forwarded to the guest integration component 202 which arranges activation of the remedial action 212 (block 406).

Figure 6:
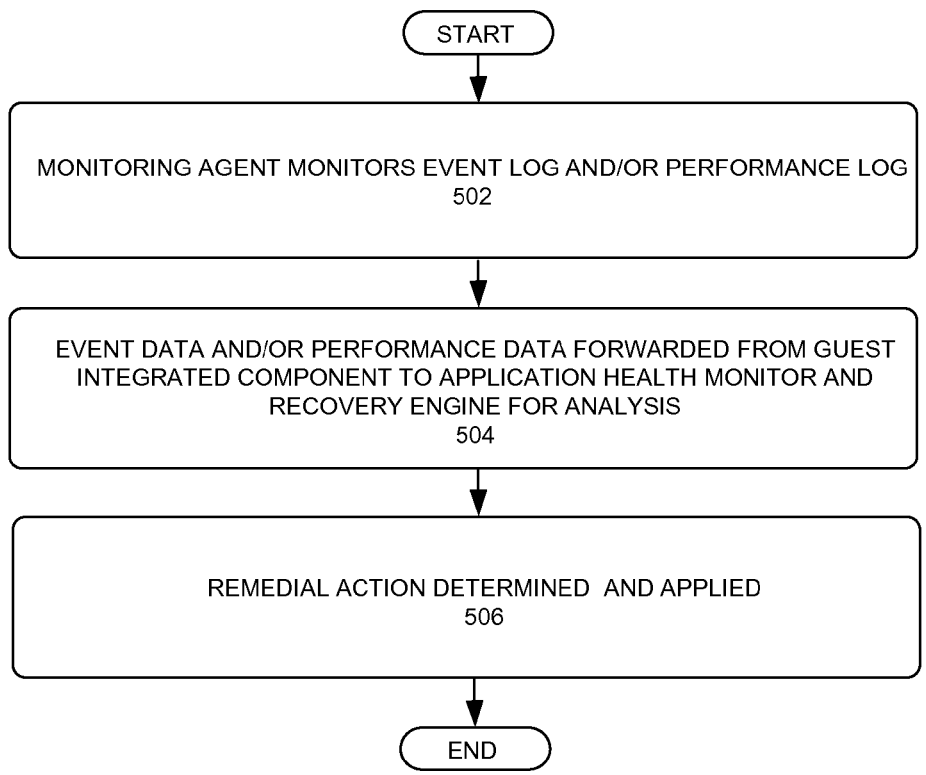
FIG. 6 illustrates a second exemplary process for health monitoring and remediation of applications in a guest partition.

FIG. 6 is a flow chart illustrating another embodiment of a process flow for health monitoring and remediation of applications in a guest partition 500. In the illustrated embodiment shown in FIG. 6, the monitoring agent 304 monitors the event log 306 and/or the performance log 308 at predetermined time intervals (block 502). The event data and/or performance data may be forwarded from the guest integrated component to the application health monitor and recovery engine 136 for analysis (block 504). The application health monitor and recovery engine 136 may determine an appropriate remedial action 312 that is forwarded to the guest integration component 302 for activation (block 506).

Figure 7:
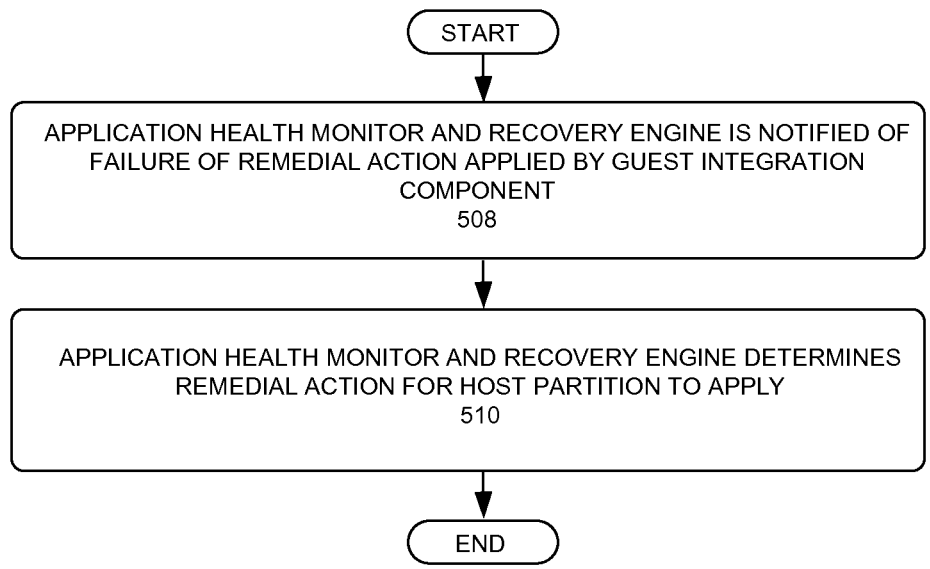
FIG. 7 illustrates a third exemplary process for health monitoring and remediation of applications in a guest partition.

FIG. 7 is a flow chart illustrating another embodiment of a process flow for health monitoring and remediation of applications in a guest partition 507. In the illustrated embodiment shown in FIG. 7, the application health monitor and recovery engine 136 may be notified by a guest integration component 110 of the failure of a previously devised remedial action to remedy an anomalous event (block 508). The application health monitor and recovery engine 136 may then devise another remedial action which may be implemented by a component in the virtualization platform 104 depending on the type of anomalous event. For example, the remedial action may include restarting the guest partition, moving the guest partition to another virtualization platform on another system, allocate additional resources to the guest partition, release resources from other guest partitions in order to allocate additional resources to a guest partition, or reconfigure the allocation of resources for one or more of the guest partitions on the system. Based on the type of remedial action, the remedial action may require the service of the hypervisor 128, the host operating system 126, or other components on the virtualization platform 104.

Figure 8:
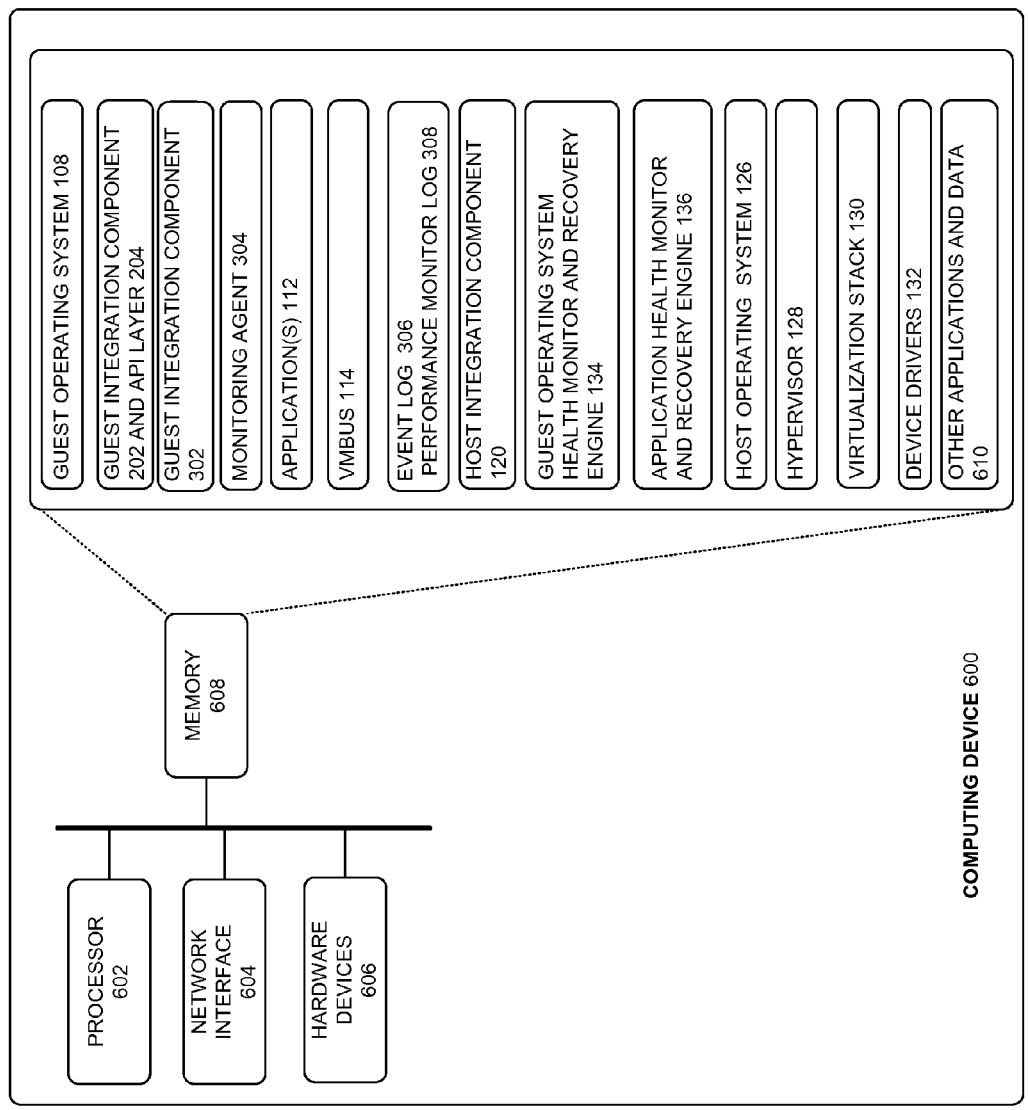
FIG. 8 is a block diagram illustrating an exemplary computing device.

Referring to FIG. 8, there is shown a block diagram of an exemplary computing environment. The illustrated computing environment shown in FIG. 8, the system 100 is embodied as a single computing device 600. The computing device 600 may be embodied as a hardware device, a software module, or as a combination thereof. As a software module, the computing device 600 may have instructions that execute in a single execution path, multiple concurrent execution paths (e.g., thread, process, etc.), or in any other manner Examples of such hardware devices may include, but are not limited to, a computer (e.g., server, personal computer, laptop, etc.), a cell phone, a personal digital assistant, or any type of computing device, and the like.

The computing device 600 may include a processor 602, a network interface 604, one or more hardware devices 606, and a memory 608. The hardware devices 606 may include input/output (I/O) devices, network interface cards, graphic cards, printer(s), a keyboard, a display, storage devices, hard disk drives, optical drives, network adaptors, graphic processors, touch screen, microphone, speakers, a system console, and so forth.

The memory 608 that may be any computer-readable storage media that may store executable procedures, computer readable instructions, data structures, program modules, applications, and data. The executable computer program instructions may be implemented according to a predefined computer language, manner or syntax, for instructing a computing device to perform a certain function. The instructions may be implemented using any suitable high-level, low-level, object-oriented, visual, compiled and/or interpreted programming language.

The computer-readable media may be formed of both volatile and non-volatile media, removable and/or non-removable media implemented in any method or technology for storage of information. The computer-readable media may include RAM, ROM, EEPROM, flash memory or other memory technology, CD-ROM, DVD, or other optical disk storage, magnetic cassettes, magnetic tape, magnetic disk storage or other magnetic storage devices, floppy disks, hard disk drives, or any other medium which may be used to store the desired information and which can be accessed by a processor. Any combination of the above is also considered computer-readable media. The computer-readable media does not pertain to propagated signals, such as a modulated data signal transmitted through a carrier wave.

The memory 608 may include instructions and data as follows:

- a guest operating system 108;
- a guest integration component 202 having an API 204;
- a guest integration component 302;
- a monitoring agent 304;
- one or more applications 112;
- a VMbus 114;
- an event log 306 and/or performance monitor log 308;
- a host integration component 120;
- guest operating system health monitor and recovery engine 134;
- application health monitor and recovery engine 136;
- a host operating system 126;
- a hypervisor 128;
- a virtualization stack 130;
- one or more device drivers 132; and
- various other applications and data 610.

Various embodiments may be implemented using hardware elements, software elements, or a combination of both. Examples of hardware elements may include devices, components, processors, microprocessors, circuits, circuit elements, integration circuits, application specific integration circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
    configuring, by a virtualization platform, at least one guest partition, each guest partition configured to execute at least one application, each guest partition configured to execute independent of other guest partitions and the virtualization platform, the at least one guest partition including a guest integration component;
    monitoring, by the virtualization platform, execution of the application;

detecting, via the guest integration component, at least one event associated with execution of the application;

applying, by the guest integration component, a first remedial action to remedy the event;

determining, via the virtualization platform, a second remedial action to remedy the event after the first remedial action fails; and applying the second remedial action.

2. The method of claim 1, wherein the guest integration component is provided by the virtualization platform.

3. The method of claim 1, further comprising:

communicating, by the application, to the guest integration component through an application programming interface, health and performance information pertaining to the application.

4. The method of claim 1, wherein the guest integration component communicates with the virtualization platform through a dedicated channel.

5. The method of claim 1, wherein the guest partition includes a monitoring agent and at least one log file, the log file including health and/or performance information pertaining to the application;

the method further comprising:

monitoring, by the monitoring agent, the application through the at least one log file.

6. The method of claim 5, wherein the at least one log file includes an anomalous event occurring during execution of the application.

7. The method of claim 5, further comprising:

accessing, by the monitoring agent, a performance monitor log, the performance monitor log having at least one performance measurement;

wherein the second remedial action is associated with the performance measurement.

8. A computer-readable storage device, storing thereon processor-executable instructions, that when executed perform a method, the method comprising:

configuring a guest partition as an independent execution environment to execute at least one application, the guest partition including a guest integration component;

monitoring, by a virtualization platform, execution of the application, the virtualization platform independent of the guest partition;

detecting, via the guest integration component, at least one event associated with execution of the application;

applying, by the guest integration component, a first remedial action to remedy the event;

determining, via the virtualization platform, a second remedial action to remedy the event after the first remedial action fails; and applying the second remedial action.

9. The computer-readable storage device of claim 8, wherein application of the first remedial action to remedy the event is performed after a guest operating system fails to remedy the event.

10. The computer-readable storage device of claim 9, further comprising:

attempting, by the application, to remedy the event unsuccessfully before the guest operating system attempts to remedy the event.

11. The computer-readable storage device of claim 8, further comprising:

executing in the guest partition a monitoring agent that monitors an event log for an anomalous event; and notifying, by the monitoring agent to the guest integration component, occurrence of the anomalous event.

12. The computer-readable storage device of claim 11, further comprising:

updating, by the application, the occurrence of the anomalous event in the event log.

13. The computer-readable storage device of claim 8, further comprising:

monitoring, by the guest integration component, runtime performance criteria of the application.

14. A system, comprising:

a processor; and a memory unit coupled to the processor, the memory unit having:

at least one guest partition and a virtualization platform, the guest partition operating independent of the virtualization platform, the guest partition including an application and a guest integration component, the guest partition configured to operate independent of the virtualization platform;

wherein the guest integration component detects at least one event requiring remediation to the application and applies a first remedial action, wherein the virtualization platform determines a second remedial action for the at least one event when application of the first remedial action is unsuccessful, and wherein the guest integration component applies the second remedial action.

15. The system of claim 14, further comprising: a dedicated channel for communication between the guest partition and the virtualization platform only.

16. The system of claim 14, the guest integration component further comprising an application programming interface that enables the application to provide the guest integration component with health monitoring data associated with the application.

17. The system of claim 14, the guest integration component further comprising a monitoring agent that when executed by the processor is operative to monitor at least one log for the at least one event requiring remediation.

18. The system of claim 14, the guest integration component further comprising a monitoring agent that monitors a performance monitor log for performance degradation of the application.

19. The system of claim 14, wherein the guest integration component is installed as a plug-in to a guest operating system operative in the guest partition.

20. The system of claim 14, the virtualization platform comprising an application health monitor and recovery engine that when executed by the processor is operative to determine a remedial action to remedy anomalous events or performance degradation of the application.

* * * * *